(12) United States Patent
DiSpezio et al.

(10) Patent No.: US 10,095,681 B2
(45) Date of Patent: Oct. 9, 2018

(54) SYSTEM AND USER INTERFACES FOR CUSTOMIZING A TEMPLATE EDITOR

(71) Applicant: Inkling Systems, Inc., San Francisco, CA (US)

(72) Inventors: Anthony DiSpezio, San Francisco, CA (US); Melinda Kilner, San Francisco, CA (US); Kesha Seeley, San Francisco, CA (US); Veronica Thompson, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 344 days.

(21) Appl. No.: 14/881,383

(22) Filed: Oct. 13, 2015

(65) Prior Publication Data
US 2017/0103054 A1    Apr. 13, 2017

(51) Int. Cl.
| | |
|---|---|
| G06F 3/048 | (2013.01) |
| G06F 17/24 | (2006.01) |
| G06F 17/22 | (2006.01) |
| G06F 3/0484 | (2013.01) |
| G06F 3/0481 | (2013.01) |
| G06F 17/21 | (2006.01) |
| G06F 3/0486 | (2013.01) |

(52) U.S. Cl.
CPC .......... *G06F 17/248* (2013.01); *G06F 3/0486* (2013.01); *G06F 3/04817* (2013.01); *G06F 3/04842* (2013.01); *G06F 17/212* (2013.01); *G06F 17/2247* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 8,108,763 B2 * | 1/2012 | Gao | G06F 17/24 715/209 |
| 2011/0300925 A1 * | 12/2011 | Adiraju | G07F 17/32 463/25 |
| 2015/0301993 A1 | 10/2015 | Hunt | |

FOREIGN PATENT DOCUMENTS

WO     2014/124443 A1    8/2014

* cited by examiner

*Primary Examiner* — Thanh Vu
(74) *Attorney, Agent, or Firm* — Ascenda Law Group, PC (57) ABSTRACT

A system, computer-readable storage medium, and computer-implemented method for populating a customized library of pattern templates for editing content works, such as publications using markup language, via a user interface having panel of patterns, are presented. The disclosure includes approaches for defining aspects of a pattern template library to balance control, flexibility, and efficiency during the publishing process.

17 Claims, 8 Drawing Sheets

SYSTEM AND USER INTERFACES FOR CUSTOMIZING A TEMPLATE EDITOR

FIELD OF THE INVENTION

Various embodiments relate to user interfaces displayed on a display of an electronic device.

BACKGROUND

In publishing, it is desirable to use a template to maintain a consistent style, appearance, or brand across pages or sections of a particular content work. Such a consistent style may additionally be useful to main consistency across a group of related content works, or all works published by the same group, etc., to help identify their relationship. A a designer may have spent time crafting an appealing style for a series of publications, and deviations from this style may result in a publication that is unattractive or less useful.

However, even though it may be desirable to ensure that multiple components of a content work, or multiple works are stylistically consistent does not necessarily mean that each component or work should use the same template or format. For example, a particular publisher may wish to constrain the designers for its works to a limited universe of stylistic or layout elements, for example because the elements within the limited universe are harmonious or signal an association with the brand, or because certain excluded elements are unacceptable or undesirable. Additionally, a publication may include different sections that do not need to share the same layout, but do need to maintain some level of visual consistency.

Development of traditional print media and other rich content (e.g., textbooks, travel books, magazines, cookbooks, how-to books, literature, and the like) involves many tasks, including managing the content creation and editing process. As print media have transitioned to electronic media, content creators and editors have been forced to either develop computer coding skills or rely on others with those skills. There is a need for more user-friendly user interfaces for designing publications that permit flexibility while also providing some constraints to ensure stylistic consistency.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which.

DETAILED DESCRIPTION

Methods, computer-readable media, and systems for a user interface for software tools, for example, a pattern template library editor and a content editing tool, are provided. In some embodiments, a user interface is presented with a preview of a rendering of a content work written in a markup language within a target environment (e.g., with the use of a particular browser, a particular device, a reader application, and/or a printed publication). The user may select representations of a pattern from a pattern library and place the pattern within a representation of rendered content to edit the content. In certain embodiments, placing the pattern inserts underlying markup language elements and/or content data (e.g., text, images, etc.) corresponding to the pattern into the content. In some embodiments, a pattern icon for a pattern on a user interface may be dragged and dropped onto a rendering of a content work at a particular position to trigger the insertion of corresponding markup language, metadata, and content data of the pattern to be placed into the content work at or near the particular position within the underlying markup file. Pattern templates may be pre-defined and selected from a library of patterns.

A "pattern", or a "pattern template", is a defined set of one or more markup language elements, metadata, and/or content data, which can be inserted directly into a selected position within a content work using the content editing tool user interface. A template pattern may be a pattern that is prepopulated with the at least one markup language element from the selected at least one representation of rendered content. In some embodiments, the template pattern markup language elements and content data may be included in a pattern library, and an icon for the template pattern may be presented within a pattern library interface such as a panel to allow for incorporation of the template pattern into content works. A pattern may comprise Cascading Style Sheet (CSS) elements and/or extensible markup language (XML) elements. By way of example, a pattern library may contain the following markup elements and content that define an exemplary template pattern:

```
<!-----Dropcap Knockout --->
<script type="application/pattern" id="dropcap-knockout" data-label="Dropcap Knockout" data-category="Text">
<p><span class="dropcap-knockout">L</span> lorem ipsum dolor....</p>
</script>
<!---- Page Header ----->
<script type="application/pattern" id="page-header" data-label="Header" data-category="Headers">
<header class="header">
  <h1>Page Title</h1>
  <p class="subtitle">Subtitle</p>
</header>
</script>
```

Markup language elements are used within a content work to instruct the software on the actions to be performed for rendering the content work. For example, markup elements may be tags "<h1>" and "</h1>" that surround text of a content work with "<h1>text</h1>" to indicate that the "text" should be displayed with a font and a font size predefined for the "h1" tag. Markup languages include, but are not limited to, the following: HTML, XML, and XHTML.

In particular, certain embodiments of the present invention provide a graphical user interface for creating a pattern library for use with a content editing tool that provides users the ability to preview and insert patterns in context within new or existing digital content works as part of the content creation or editing process. In some cases, the disclosed embodiments permit users with no or limited knowledge of computer coding techniques or experience with markup languages a convenient way to define a cohesive style for a content work or set of content works by populating a customized pattern template library as part of a content creation or editing process.

"Content works" are works to be published for consumption by a user in a target environment, such as, for example, a reader application or web browser on a tablet or a computer, a printed book, or PDF pamphlet. In some embodiments, content works may incorporate animated or dynamic elements, or dynamic media such as video. In some embodiments, the content works may consist of containers such as "cards" or "media cards." These cards may be templates for digital content works that include, among other things, one or more text sections, one or more image sections, image captions, and header sections, all arranged in a desired order. A collection of related cards may form a digital content work, for example an electronic book, magazine, article, etc., or a portion thereof, e.g., a section or chapter thereof, etc. In some embodiments, content or content works may be assembled from patterns drawn from a library of pattern templates. In some embodiments, content such as text or images may be added to a content work in addition to pattern templates.

Figure 1:
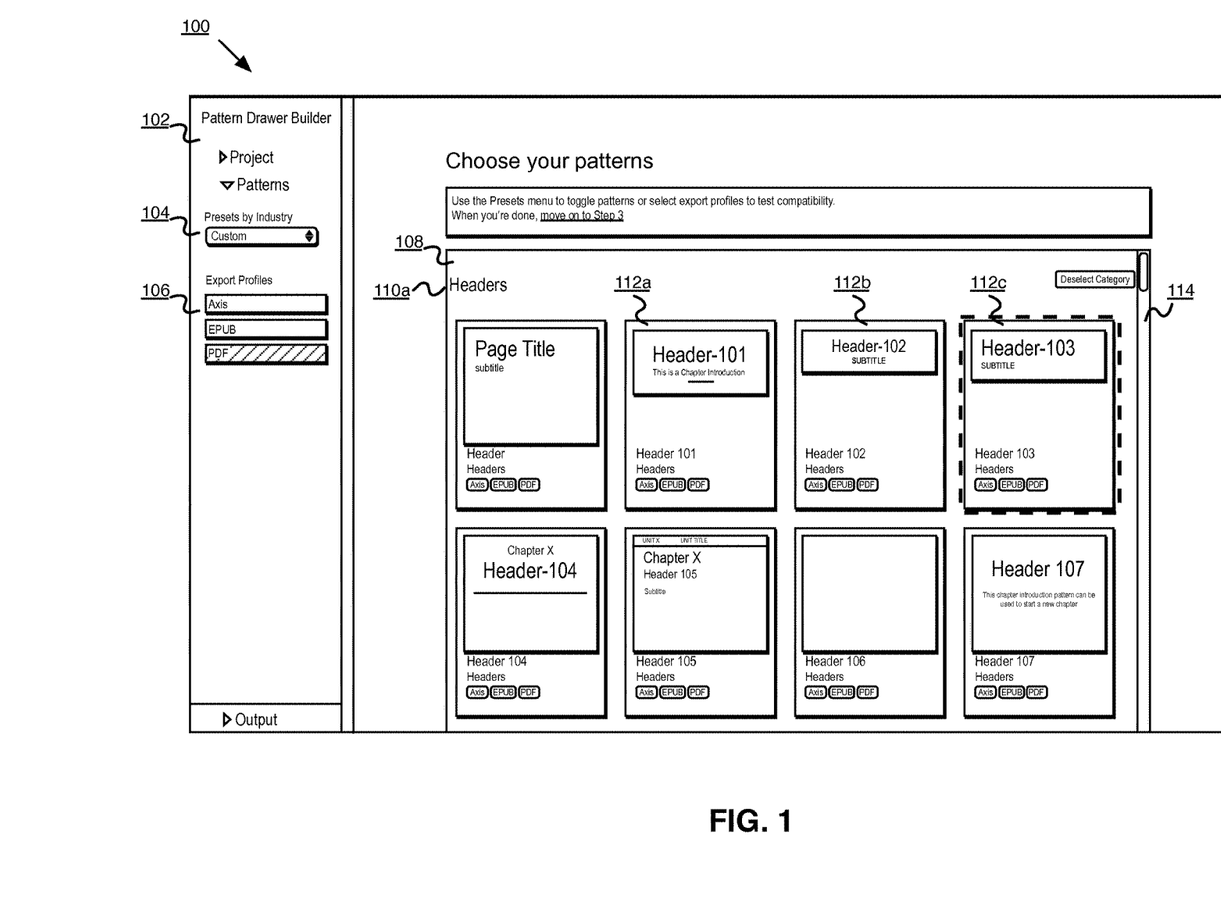
FIG. 1 is an exemplary user interface for populating a customized library of pattern templates, in accordance with some embodiments of the invention.

FIG. 1 shows an exemplary user interface 100 for populating a customized library of pattern templates. User interface 100 includes pattern panel 108. Pattern panel 108 may display a master list of patterns that are available to use. The patterns may be displayed using previews of the appearance of the pattern—for example, the patterns may be displayed as renderings of sample content in accordance with the one or more markup elements corresponding to the pattern. In certain embodiments, the pattern previews may be based on renderings of user-provided content. Pattern previews 112 may be arranged according to categories of patterns 110 (e.g. "headers" 110a, or "sections" 110b). Pattern previews 112 may include information or comments about the pattern, such as a pattern name or descriptions regarding compatibility with particular export formats such as Axis, EPUB, Sharable Content Object Reference Model (SCORM), and Portable Document Format (PDF). Pattern previews 112 are selectable; for example, as shown in FIG. 1, pattern preview 112b is not selected and pattern preview 112c is shown to be selected.

The pattern previews 112 displayed in pattern panel 108 may represent a comprehensive, master set of patterns. For example, such a master set of patterns may incorporate multiple visual styles, and may include features that are not appropriate for all types of publications. The master set of patterns may be very lengthy. It may take a significant amount of time to scroll through previews of the entire master set of patterns, for example using scroll bar 114.

User interface 100 includes information panel 102, which may include tools for filtering patterns or providing information about selected patterns. For example, prompt 104 provides a selectable menu for automatically selecting a set of patterns optimized for a publication category such as particular industries or publication types. For example, the categories may be sales enablement, employee training, text book, marketing materials, conventional trade publishing, or documentation. In certain embodiments, use of such a filter may cause the tool to display pattern previews 112 for only the set of patterns optimized for the selected category, or to display visual indicator in connection with the optimized set of patterns such as a distinctive border or an annotation to the pattern preview in pattern panel 108.

Information panel 102 may additionally include an export selector 106. In certain embodiments, selecting one or more particular export formats, such as Axis, EPUB, or PDF, may affect how pattern previews 112 are displayed in pattern panel 108. For example, pattern previews 112 that are compatible with the selected formats may include a compatibility indicator, such as a PDF marker where the particular pattern associated with pattern preview 112 is compatible with a PDF export format.

Figure 2:
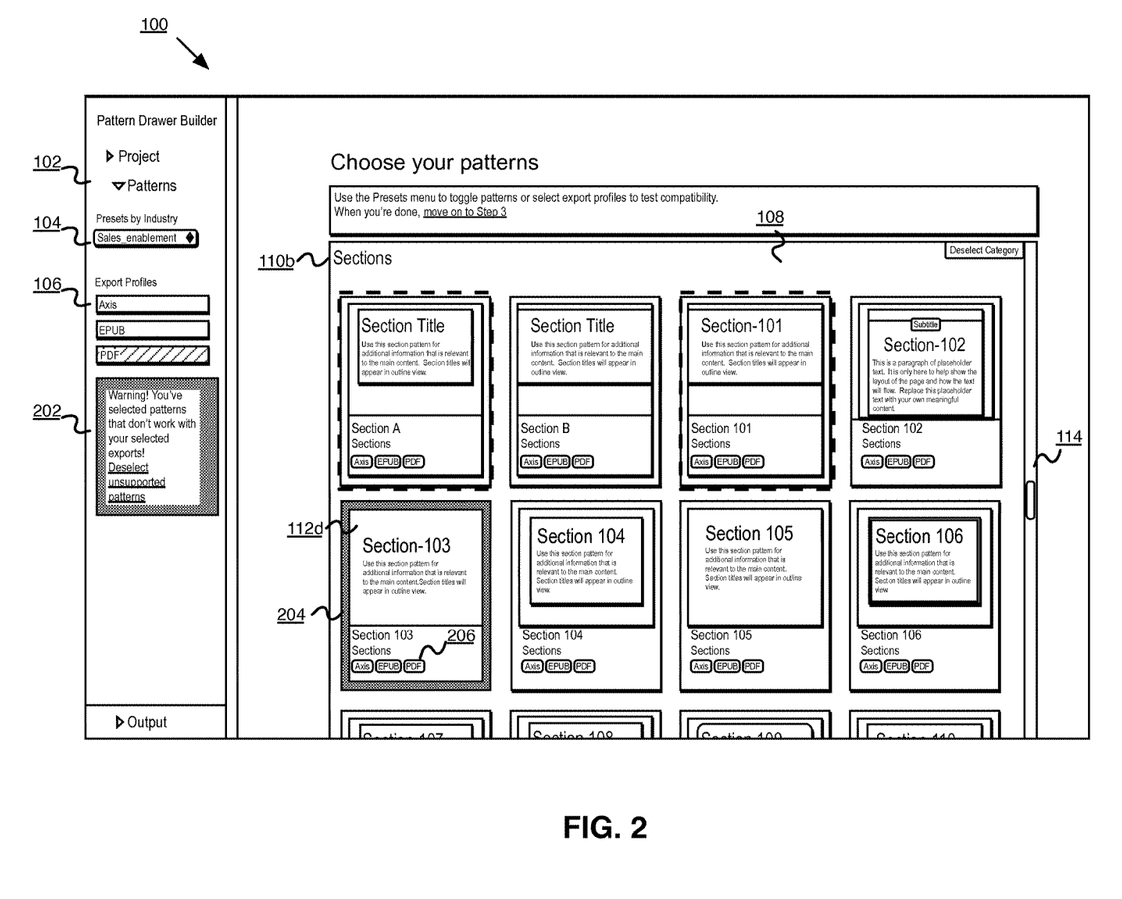
FIG. 2 is an exemplary user interface for populating a customized library of pattern templates including a warning, in accordance with some embodiments of the invention.

FIG. 2 shows another view of exemplary user interface 100. In certain embodiments, the system may provide a warning related to patterns that are incompatible with a particular export format. In FIG. 2, the user has selected PDF in export selector 106. Information panel 102 displays a warning message 202 to indicate that the user has selected certain patterns that are incompatible with PDF (for example, a pattern may be associated with a dynamic element that cannot be displayed in a PDF). The pattern associated with pattern preview 112d is incompatible with PDF format, so preview 112d is displayed with a differently colored (or styled) pattern preview border 204 and may include a differently colored (or styled) PDF export indicator 206, wherein these items are displayed differently from previews for compatible patterns. Differently styled means displayed using a different appearance, such as different font, shape, or border. Warning message 202 may include an option to automatically deselect unsupported patterns.

Figure 3:
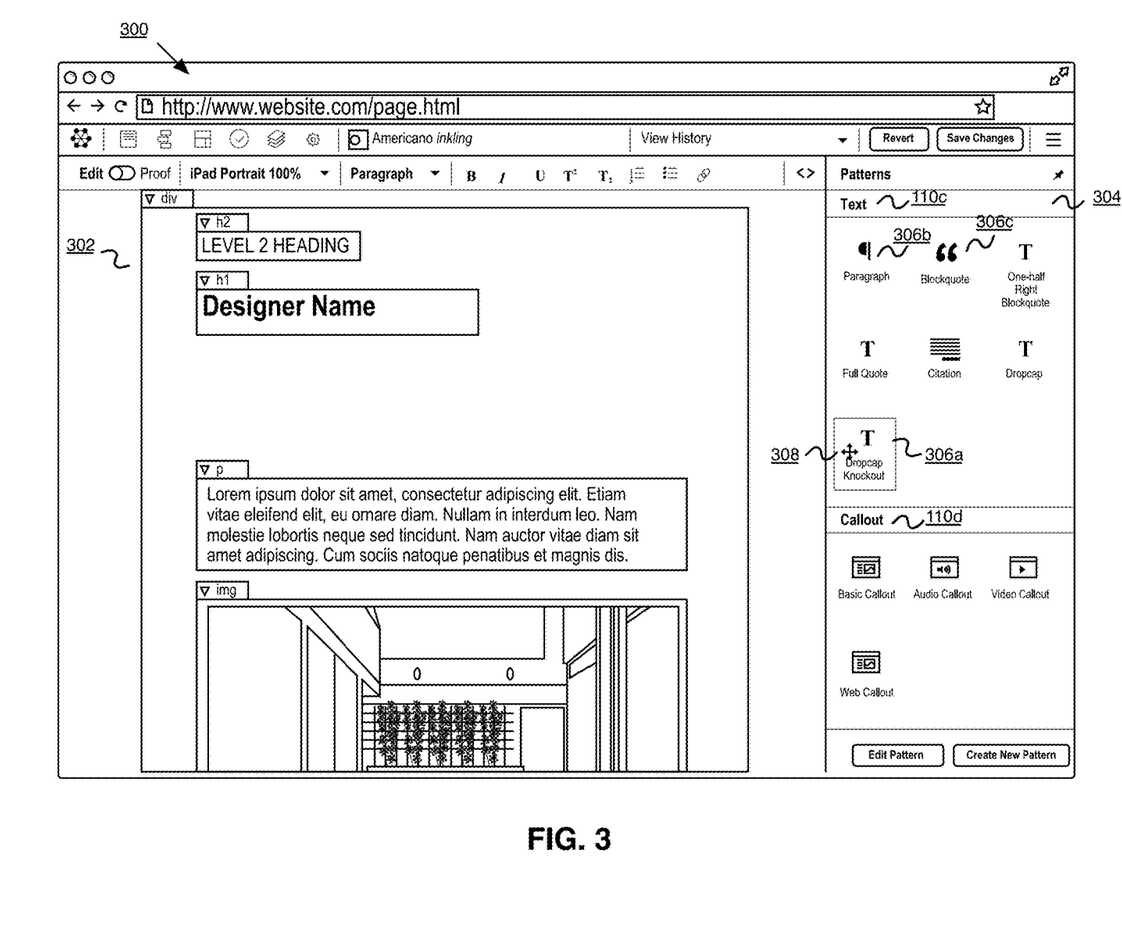
FIG. 3 is an exemplary user interface including a panel displaying a library of pattern templates, in accordance with some embodiments of the invention.

FIG. 3 shows an exemplary user interface 300 in accordance with some embodiments of the invention. User interface 300 is a graphical user interface for a content editing tool with a presentation panel 302 and a pattern library panel 304. Techniques for creating and editing digital content works that may be used in some embodiments are described in U.S. patent application Ser. No. 14/692,393 and International Patent Application No. PCT US2014/15818, and are herein incorporated by reference. The presentation panel 302 provides a preview of a rendering of the content work (e.g., a file, a card, an image and/or other portion of the content work) within a target environment. The target environment may be the software (e.g., browser) and/or device (e.g., mobile device or laptop device) that the content editor intends for the content work to be displayed, and the presentation panel may provide a preview of the anticipated rendering of the content work within the target environment. In some embodiments, the target for the content work may be a print publication, and the content work may be rendered to depict the target of a printed content work.

The pattern library panel 304 provides pattern icons (e.g., Paragraph icon 306b and Blockquote icon 306c), and the user may provide input to select a pattern icon and position the pattern icon within the rendering of the content work on the presentation panel 302 to trigger the inclusion of the grouping of markup language elements and/or content data that are defined for the pattern into the content work at or near that position. The corresponding grouping of markup language elements and/or content data may be inserted into the underlying markup file for the rendered content work at or near the position designated by the user within the rendering.

The library displayed in pattern library panel 304 may represent a customized pattern library, e.g., as populated from a master set of patterns via user interface 100. Library panel 304 may include representations of patterns in a customized pattern library, such as pattern icons 306. In certain embodiments, library panel 304 may include pattern previews, icons, or other representations of patterns such as textual pattern labels.

For example, pattern icon 306a may be provided within the pattern library panel 304 for selection and insertion of the corresponding markup elements and content data for the pattern. As shown, a pattern icon 306a may be selected from the pattern library panel 304 and dragged and dropped into a position within a rendering of content work in the presentation panel 302. Cursor 308 may change shape to indicate that a pattern icon 306 is draggable.

Pattern panel 304 may be populated all or in part by selecting patterns from a master set of patterns. In certain embodiments, user interface 300 may allow the user to add additional patterns to a customized pattern library to be accessed through pattern panel 304 from a master set of patterns. The user may input a new name for the pattern. In certain embodiments, user interface 100 or 300 may enable the user to change additional properties of a pattern, including the name 304, an associated icon (e.g. pattern icon 306a), and/or associate comments or metadata such as version information or an author for the pattern.

In certain embodiments, available patterns may be grouped into categories 110 within pattern library panel 304. For example, categories of patterns may include headers, sections, styled lists, text, widgets, callouts, and images. Widget patterns may include embeddable objects with enhanced functionality, such as flash cards, multiple choice questions, images annotated with "pop" tips, and the like.

Figure 4:
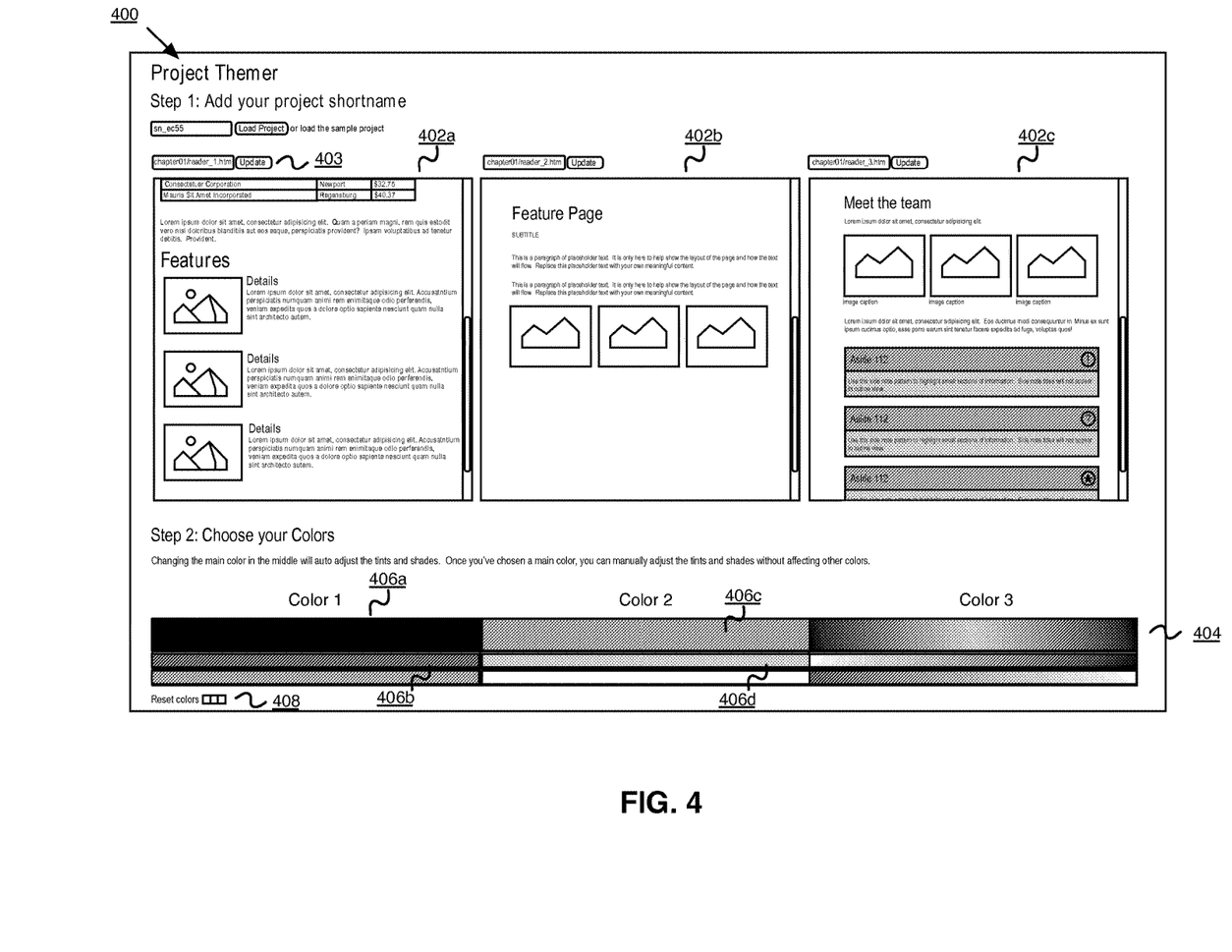
FIG. 4 is an exemplary user interface for defining a color scheme for a content work, in accordance with some embodiments of the invention.

FIG. 4 shows an exemplary user interface 400 for defining a color scheme for a content work. User interface 400 may include one or more preview pages 402 that dynamically render one or more pages of content in accordance with the current settings of color picker 404. A user may change the content rendered in preview pages 402 using a selector such as selector 403. For example, selector 403 could be used to select a category of page, or to select a particular file to render. Color picker 404 may include one or more main colors 406 and one or more tints and/or shades of each main color 406. Color picker 404 may automatically choose tints and shades based on the user's selection of each main color 406.

Whether a layout element or portion of content is displayed in a particular color may be an aspect of a pattern. For example, a heading pattern may require that the heading be displayed using main color 1 (406a), and the next subheading be displayed using the shade of main color 1 (406b). In another example, a table heading row may be displayed using the second main color (406c), and the other rows of the table may be displayed using the tint of the main color 2 (406d). In certain embodiments, there may be a reset colors control 408, or an option to select from a list of pre-set colors to update the color picker 404 and preview pages 402.

In some embodiments, selecting colors via color picker 404 result in creating CSS elements such as:

```
/*---- header-101 ------*/
.color1 .header-101 {
background: #1b3535;
color: #fff;
}
.color1 .header-101 h1 {
color: #9bd0d1;
}
.color1 .header-101 .subtitle {
color: #fff;
}
```

In certain embodiments, a user interface 400 may be used to select colors to be used in a customized pattern template library. In certain embodiments, such colors may be selected prior to using user interface 100 to populate a customized library of patterns, and thus user interface 100 may include pattern previews 112 that incorporate and/or display the selected colors. In certain embodiments, user interface 400 is used to select colors after populating a customized library of patterns.

Figure 5:
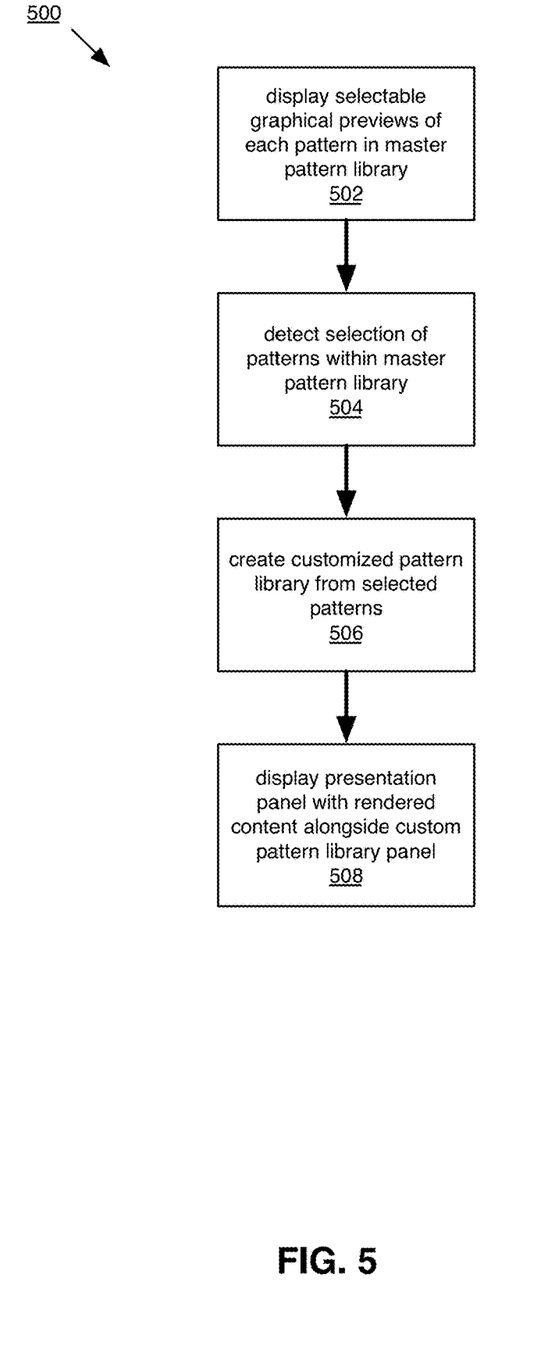
FIG. 5 is a flowchart depicting an exemplary process for populating a customized library of pattern templates, in accordance with some embodiments of the invention.

FIG. 5 is a flowchart depicting an exemplary process 500 for populating a customized library of pattern templates. As described above, for example with respect to FIG. 1, a user interface such as 100 may be used to populate such a customized library of pattern templates. In the embodiment shown in FIG. 5, first, selectable graphical previews of each pattern in a master library of patterns is displayed (502). In some examples, the pattern previews 112 may be displayed in a series of pages. In some examples, only a subset of the master library of patterns is displayed.

Next, in certain embodiments, selection of some of the patterns in the master library is detected (504). Next, in certain embodiments, a customized pattern library is created based on the selected patterns (506). Next, in certain embodiments, representations of the customized pattern library 304 are displayed alongside a presentation panel 302, where the presentation panel 302 displays rendered content for editing using the library of patterns (508).

By populating the customized pattern library in such a way, the system provides flexibility in creating templates or a family of templates for a content work or set of content works, as users may assemble a customized pattern library from a large, master library. But the system also makes template creation and publishing more efficient by limiting the number of patterns a user must scroll through in the pattern library panel while designing or laying out a page of content, once a customized pattern library has been established.

This approach additionally allows a more design-focused user to create a customized pattern library for use in a content editing tool so that a more content-focused user, or a user with limited design skills, may use the customized pattern library and content-editing tools to edit individual works that comport with the design-focused user's vision.

In one particular example, a Sales trainer may need to create a pattern library that is specific to Technology Sales. The trainer can efficiently select a preset pattern category such as sales enablement. The trainer then removes any of the automatically selected patterns that are not needed, thereby creating a subset category of patterns that can provide efficient access to the trainer's specialized pattern needs.

Figure 6:
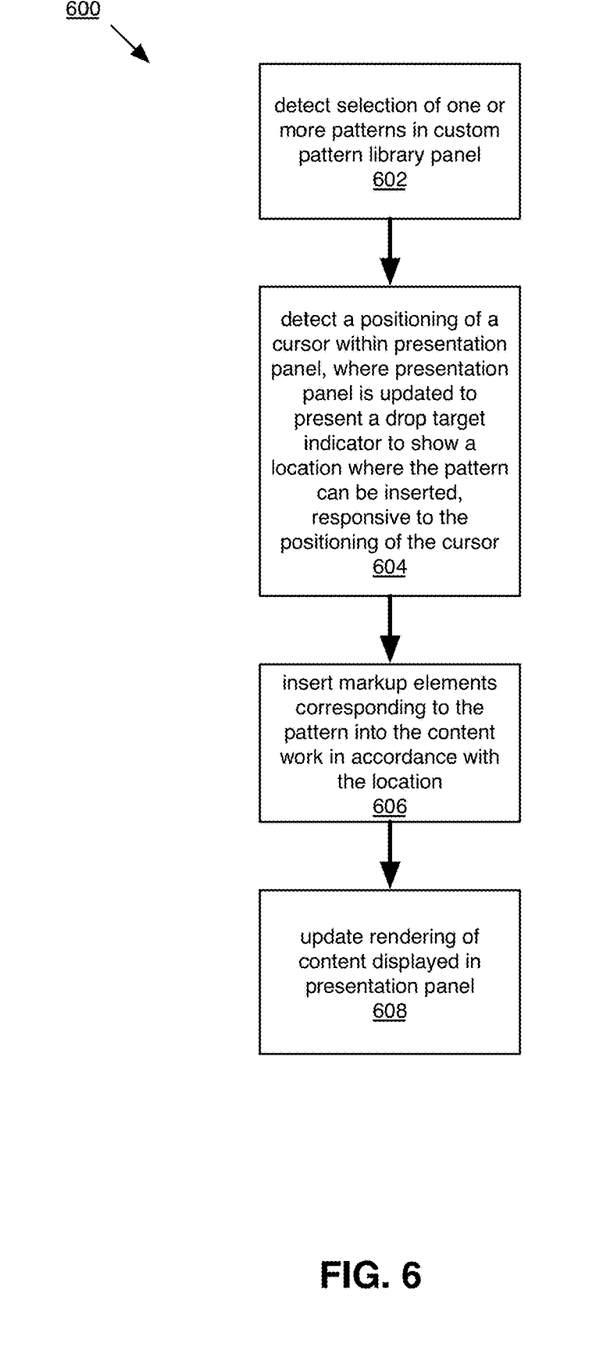
FIG. 6 is a flowchart depicting an exemplary process for using a panel of pattern templates in a user interface, in accordance with some embodiments of the invention.

FIG. 6 is a flowchart depicting an exemplary process 600 for using a panel of pattern templates. As also described above, a user may select a pattern icon (e.g., pattern icon 306a) and a position for the pattern icon within the presentation panel 102 to trigger an insertion of one or more markup language elements (and/or content data) corresponding to the pattern icon into the content work. In certain embodiments, a user may summon the pattern library panel 304 by moving the cursor to a trigger area, such as the right edge of presentation panel 302. For example, when the cursor is moved to the trigger area, pattern library panel 304 may slide out from the right side of the panel, and then may slide back into the right side of presentation panel 302 when the cursor leaves the trigger area.

In the embodiment shown in FIG. 6, first, a selection of a pattern icon (e.g., pattern icon 306a) within a pattern library panel 304 of a user interface may be detected (602). A wiggling icon may indicate that it is draggable. Thus in certain embodiments, when the cursor hovers over a pattern icon in the pattern library panel 304, the pattern icon will wiggle for a period of time, for a set number of wiggles (e.g., one, two, or five), or until the cursor leaves the icon. In certain embodiments, the appearance of the pattern icon may be changed when a user interface selection component such as a cursor is in a position where the pattern/pattern icon may be selected. The appearance of the cursor may also be changed when it is in a position where a pattern/pattern icon may be selected—for example, the cursor icon may change, and in certain embodiments the change may be dependent on the type of pattern that may be selected. A user may select an icon by clicking on it or by any other selection method known in the art.

Next, in certain embodiments, a positioning of a cursor within a presentation panel of the user interface is detected, and the presentation panel 302 is updated to present a drop target indicator to show a location where the pattern can be inserted responsive to the positioning of the cursor (604). In some embodiments, the drop target indicator may comprise a user interface indicator, such as a cursor or selected icons, that may visually indicate a location or position on a display and thereby allow the user to indicate a desired position on the display with the user interface indicator. For example, the cursor may change shape when it is positioned over a location where the pattern can be inserted. In certain embodiments, a representation of rendered content may be displayed using highlighting when the representation corresponds to a location near the positioning of the cursor where the pattern can be inserted. In certain embodiments, a representation of rendered content corresponding to the current available location may be highlighted using an indication of the corresponding type of markup element, as shown in element 310 in FIG. 3. In certain embodiments, a representation of rendered content corresponding to the current available location may be highlighted by displaying a visible border around the element, as shown in element 10 in FIG. 3. In certain embodiments, a shape may be displayed to indicate where the pattern can be inserted, such as a horizontal line extending the length of a table row or table cell. In certain embodiments, the pattern may be "ghosted" into a location in the presentation panel, showing a preview of what the inserted pattern would look like.

Next, in certain embodiments, one or more markup language elements corresponding to the pattern icon are inserted into the content work in accordance with the location (606) and an updated preview of a rendering of the content work is displayed (608). In certain embodiments, upon selection of an insertion location for the pattern, a prompt for information may be provided to the user. For example, if the pattern to insert comprises an image, the prompt may request the location of the image file or data to display. For example, if the pattern comprises a video, the prompt may request the location of a video or movie file to insert. For example, if the pattern comprises a table, the prompt may request the number of rows and columns in the table to be inserted.

In some embodiments, a user interface indicator, such as a cursor or selected icons, may visually indicate a location or position on a display and thereby allow the user to indicate a desired position on the display with the user interface indicator. The user may also indicate selection (e.g., via clicking a mouse button) of various user interface elements (e.g., icons) at positions indicated by the user interface indicator. The movement of the cursor or other user interface indicator element may be received as input with the use of an input device (e.g., a mouse, touch pad, keyboard, motion controller/detector, touch pad, etc.) and/or indicated on a touch screen of a device, and the input may cause the user interface indicator to enter and be positioned within a target region. For example, input of one or more movements with the input device may be received that are translated to position the cursor or other user interface indicator element within the target region on a display and the positioning/entry into the target region may be detected. In another example, a user may direct the cursor or other visual user interface indicator with her/his finger and/or a stylus across a touch screen into the target region. Additional structures and approaches for receiving user input and handling a target region may be found in U.S. application Ser. No. 14/692, 393, hereby incorporated by reference.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 7:
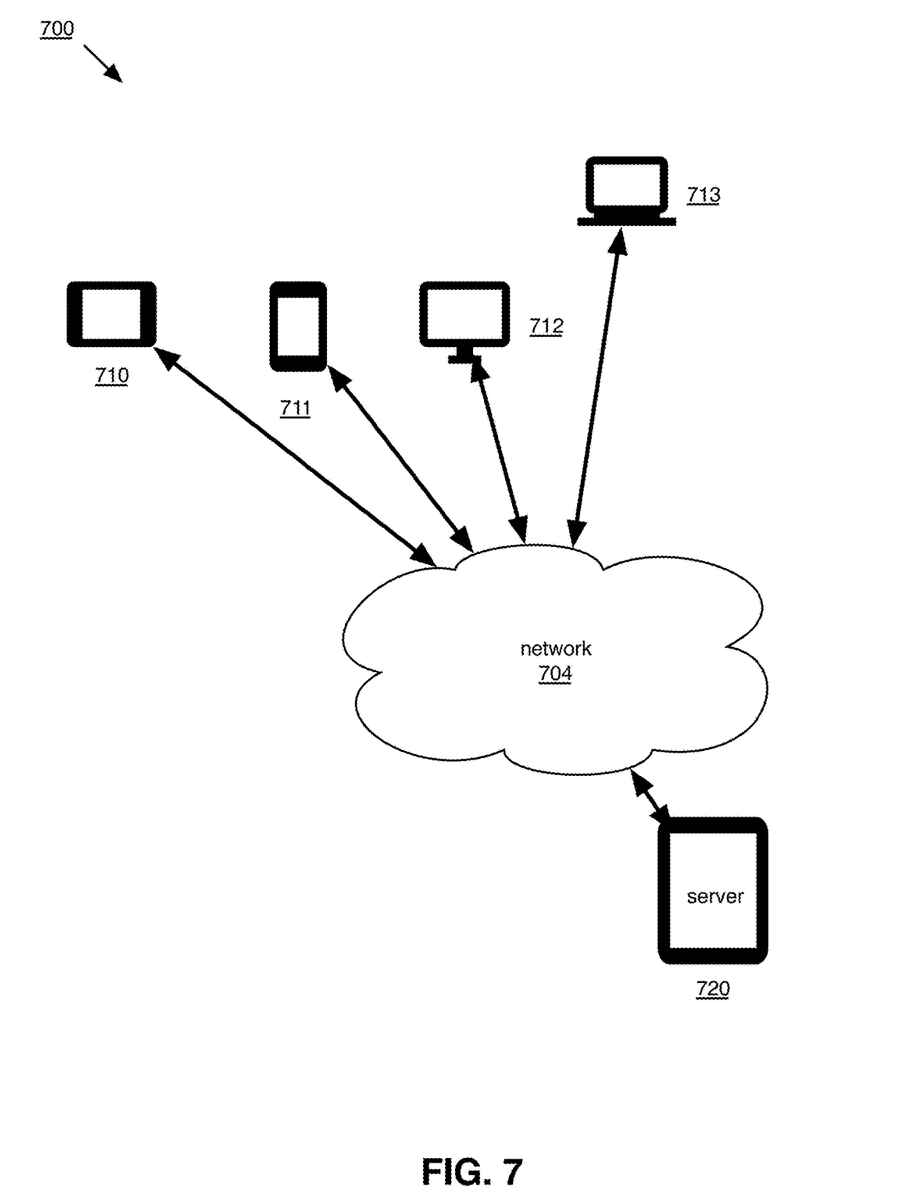
FIG. 7 is a block diagram showing exemplary data communication flows for an exemplary system, consistent with some embodiments of the invention.

FIG. 7 is a block diagram showing exemplary data communication flows for an exemplary system. In certain embodiments, user input is received by one or more computing devices 710-713, and the user interfaces are displayed by the one or more computing devices 710-713. Computing devices may include mobile devices such as tablet 710 and smart phone 711; other computing devices include laptop 713, desktop computer 712, and server 720. In certain embodiments, the user input is received by server 720 or computing devices 710-713 via network 804.

Further the procedures described herein may involve the use of various computer systems and computer readable storage media having computer-readable instructions stored thereon.

Figure 8:
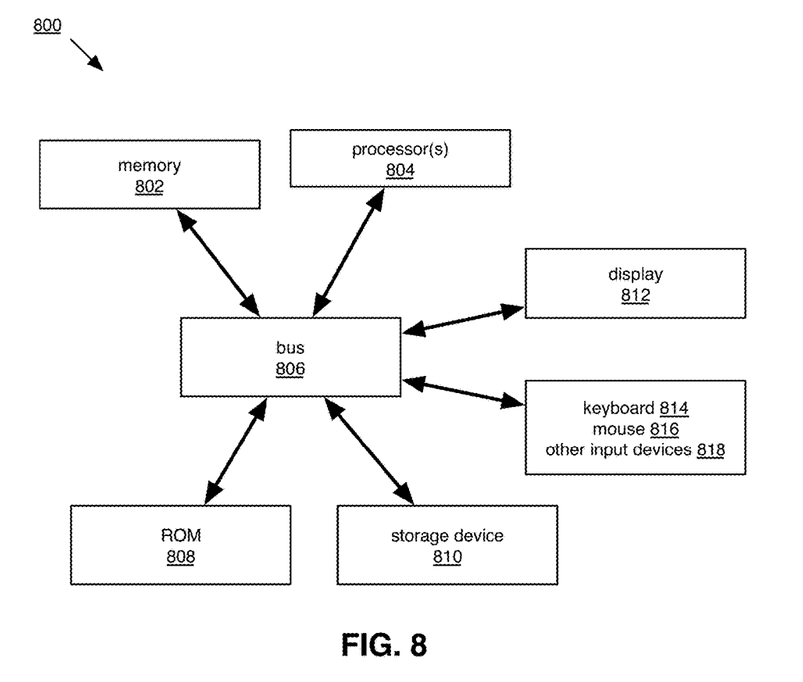
FIG. 8 is a block diagram showing an exemplary computing device, consistent with some embodiments of the invention.

FIG. 8 is a block diagram showing an exemplary computing system 800 that is representative any of the computer systems or electronic devices discussed herein. Note, not all of the various computer systems have all of the features of system 800. For example, systems may not include a display inasmuch as the display function may be provided by a client computer communicatively coupled to the computer system or a display function may be unnecessary.

System 800 includes a bus 806 or other communication mechanism for communicating information, and a processor 804 coupled with the bus 806 for processing information. Computer system 800 also includes a main memory 802, such as a random access memory or other dynamic storage device, coupled to the bus 806 for storing information and instructions to be executed by processor 804. Main memory 802 also may be used for storing temporary variables or other intermediate information during execution of instructions to be executed by processor 804.

System 800 includes a read only memory 808 or other static storage device coupled to the bus 806 for storing static information and instructions for the processor 804. A storage device 810, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 804 can read, is provided and coupled to the bus 806 for storing information and instructions (e.g., operating systems, applications programs and the like).

Computer system 800 may be coupled via the bus 806 to a display 812 for displaying information to a computer user. An input device such as keyboard 814, mouse 816, or other input devices 818 may be coupled to the bus 806 for communicating information and command selections to the processor 804.

The processes referred to herein may be implemented by processor 804 executing appropriate sequences of computer-readable instructions contained in main memory 804. Such instructions may be read into main memory 804 from another computer-readable medium, such as storage device 810, and execution of the sequences of instructions contained in the main memory 804 causes the processor 804 to perform the associated actions. In alternative embodiments, hard-wired circuitry or firmware-controlled processing units (e.g., field programmable gate arrays) may be used in place of or in combination with processor 804 and its associated computer software instructions to implement the invention. The computer-readable instructions may be rendered in any computer language including, without limitation, Objective C, C#, C/C++, Java, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

Figure 9:
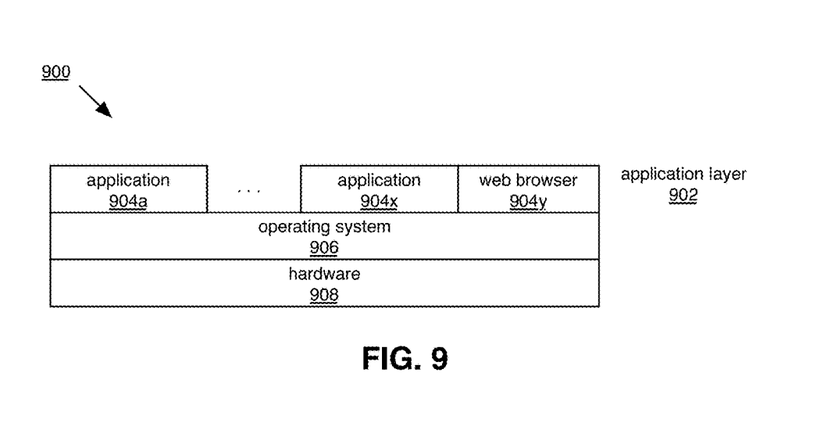
FIG. 9 is a block diagram showing an exemplary computing system, consistent with some embodiments of the invention.

FIG. 9 illustrates a computer system 900 from the point of view of its software architecture. Computer system 900 may be any of the electronic devices or, with appropriate applications comprising a software application layer 902, may be a computer system for use with the publishing tools described herein. The various hardware components of computer system 900 are represented as a hardware layer 908. An operating system 906 abstracts the hardware layer and acts as a host for various applications 904, that run on computer system 900. The operating system may host a web browser application 904y, which may provide access for the publishing tools, etc.

The drawings show, by way of illustration, specific embodiments in which the invention can be practiced. These embodiments are also referred to herein as "examples." Such examples can include elements in addition to those shown or described. However, additional examples are contemplated in which only those elements shown or described are provided. Moreover, additional elements are contemplated that use combinations or permutations of those elements shown or described (or one or more aspects thereof), either with respect to a particular example (or one or more aspects thereof), or with respect to other examples (or one or more aspects thereof) shown or described herein.

Thus, methods and systems for converting content created by software tools, for example desktop publishing tools, in formats intended for use with print-based distributions of the content, as well as formats suitable for use in connection with digital distributions of the content have been described.

What is claimed is:

1. A method for populating a customized library comprising a plurality of selected pattern templates, comprising:
displaying a plurality of renderings of sample content in accordance with at least one markup language element, wherein each respective rendering of sample content corresponds to a master pattern template of a plurality of master pattern templates, the respective rendering of sample content comprising a rendering of at least one markup language element, and the plurality of renderings of sample content visually represents a master pattern template library consisting of the plurality of master pattern templates;
detecting a selection of two or more of the plurality of renderings of sample content that corresponds to a subset of the master pattern templates of the master pattern template library;
displaying an indication of whether a respective master pattern template is compatible with a plurality of output formats;
populating a customized pattern template library based on the selection; and
displaying a representation of each pattern template of the customized pattern template library in connection with a user interface of a content editing tool.

2. The method of claim 1, wherein the representation of each pattern template in the customized pattern template library is an icon, or a rendering of sample content in accordance with the pattern template.

3. The method of claim 1, wherein the representation of each pattern template in the customized pattern template library is displayed in a panel, and the content editing tool may receive instructions that a user has dragged a particular pattern template from the customized pattern template library panel into a presentation panel and accordingly incorporate an instance of the particular pattern template into content loaded into the content editing tool.

4. The method of claim 1, wherein the pattern templates comprise Cascading Style Sheet (CSS) elements and/or extensible markup language (XML) elements.

5. The method of claim 1, further comprising displaying an indication comprising a warning message regarding output format compatibility that is responsive to a current selection of pattern templates.

6. The method of claim 1, further comprising:
receiving a selection of a publication category; and
automatically selecting a subset of the master pattern template library based on the selection of the publication category.

7. The method of claim 1, further comprising:
displaying a panel of colors and default selections of the panel of colors;
displaying a plurality of renderings of sample content in accordance with the currently selected colors;
detecting an updated selection of colors; and
displaying an updated plurality of renderings of sample content in accordance with the updated currently selected colors.

8. A system for populating a customized library comprising a plurality of selected pattern templates, comprising:
one or more computer-readable storage media configured to store instructions; and
one or more processors configured to execute the instructions to cause the system to:
provide a plurality of renderings of sample content in accordance with at least one markup language element,
wherein each respective rendering of sample content corresponds to a master pattern template of a plurality of master pattern templates, the respective rendering of sample content comprising a rendering of at least one markup language element, and the plurality of renderings of sample content visually represents a master pattern template library consisting of the plurality of master pattern templates;
receive a selection of two or more of the plurality of renderings of sample content that corresponds to a subset of the master pattern templates of the master pattern template library;
provide an indication comprising a warning message regarding output format compatibility that is responsive to the selection of two or more of the plurality of renderings of sample content;
populate a customized pattern template library based on the selection; and
provide a representation of each pattern template of the customized pattern template library in connection with a user interface of a content editing tool.

9. The system of claim 8, wherein the representation of each pattern template in the customized pattern template library is an icon, or a rendering of sample content in accordance with the pattern template.

10. The system of claim 8, wherein the representation of each pattern template in the customized pattern template library is provided via a panel, and the content editing tool is configured to receive instructions that a user has dragged a particular pattern template from the customized pattern template library panel into a presentation panel and accordingly incorporate an instance of the particular pattern template into content loaded into the content editing tool.

11. The system of claim 10, wherein the content editing tool is executed in a web browser running on a client device.

12. The system of claim 8, wherein the pattern templates comprise Cascading Style Sheet (CSS) elements and/or extensible markup language (XML) elements.

13. The system of claim 8, further comprising causing the system to provide an indication of whether a respective master pattern template is compatible with a plurality of output formats.

14. The system of claim 8, further comprising causing the system to:
receive a selection of a publication category; and
automatically select a subset of the master pattern template library based on the selection of the publication category.

15. The system of claim 8, further comprising causing the system to:
provide a panel of colors and default selections of the panel of colors;
provide a plurality of renderings of sample content in accordance with the currently selected colors;
detect an updated selection of colors; and
provide an updated plurality of renderings of sample content in accordance with the updated currently selected colors.

16. The system of claim 8, wherein the one or more processors are located at a server, and the selection of a subset of the plurality of renderings is received from a client device.

17. The system of claim 8, wherein the one or more processors are located at a client device.

* * * * *